United States Patent
Samy

(10) Patent No.: US 8,982,967 B2
(45) Date of Patent: Mar. 17, 2015

(54) METHOD AND DEVICE FOR REDUCING INTERFERENCE BETWEEN A POWER LINE CARRIER SIGNAL AND A VDSL TYPE SIGNAL

(75) Inventor: Roger Samy, Rueil Malmaison (FR)

(73) Assignee: Sagemcom Broadband SAS, Rueil Malmaison (FR)

( * ) Notice: Subject to any disclaimer, the term of this patent is extended or adjusted under 35 U.S.C. 154(b) by 0 days.

(21) Appl. No.: 13/257,392

(22) PCT Filed: Mar. 15, 2010

(86) PCT No.: PCT/EP2010/053242
§ 371 (c)(1),
(2), (4) Date: Nov. 21, 2011

(87) PCT Pub. No.: WO2010/105996
PCT Pub. Date: Sep. 23, 2010

(65) Prior Publication Data
US 2012/0106606 A1 May 3, 2012

(30) Foreign Application Priority Data
Mar. 18, 2009 (FR) ...................................... 09 51739

(51) Int. Cl.
*H04B 3/00* (2006.01)
*H04L 5/00* (2006.01)
(Continued)

(52) U.S. Cl.
CPC ................ *H04L 5/0008* (2013.01); *H04B 3/28* (2013.01); *H04L 5/0042* (2013.01); *H04L 5/0046* (2013.01); *H04L 5/006* (2013.01); *H04L 5/0062* (2013.01); *H04L 27/36* (2013.01)
USPC ....................................................... 375/257

(58) Field of Classification Search
None
See application file for complete search history.

(56) References Cited

U.S. PATENT DOCUMENTS 5,410,632 A * 4/1995 Hong et al. .................... 704/233
6,744,813 B1 * 6/2004 Ko et al. ........................ 375/224
(Continued)

OTHER PUBLICATIONS

Yoshiharu Akiyama, Hiroshi Yamane, Nobuo Kuwabara, "Influence of a PLC signal induced into the modem on the communication performance of VDSL", 2003 IEEE International Symposium on Electromagnetic Compatibility, 2003. EMC '03;.*

(Continued)

*Primary Examiner* — Santiago Garcia
(74) *Attorney, Agent, or Firm* — Nixon & Vanderhye, PC

(57) ABSTRACT

The present invention concerns a method of reducing interference between a carrier current signal ($S_{CPL}$) transmitted over an electrical line (Le) and a signal of the VDSL type ($S_{VDSL}$) transmitted over a telephone line (Lpots) that is situated close to the electrical line (Le). Said signals ($S_{CPL}$, $S_{VDSL}$) routing data in the form of bits that are attributed to carrier frequencies ($F_k$) distributed in the same frequency band on different frequency planes, characterized in that it comprises.

Figure 1:
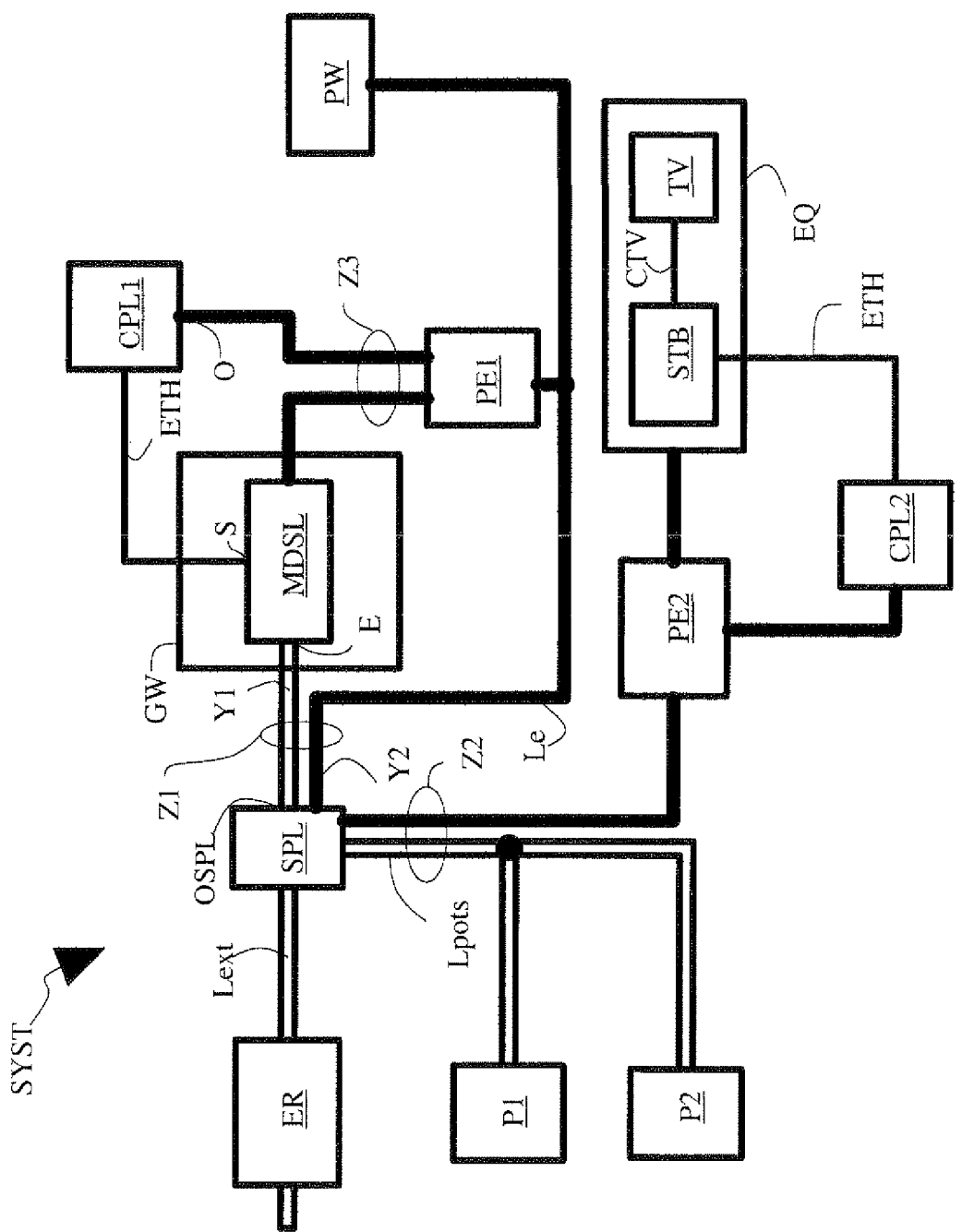

a step (1) for determining at least one carrier frequency ($F_{VDSL}$), referred to as the VDSL frequency, of a frequency plane used for transmitting the VDSL-type signal the spectral power density level of which is higher than a predetermined threshold (Th), a step (2) for determining at least one carrier frequency ($F_{CPL}$), referred to as the CPL frequency, of another frequency plane used for transmitting the carrier current signal and which is common with at least one VDSL frequency thus determined ($F_{VDSL}$), and a step (3) for reducing the number of bits ($N_{CPL}$) attributed up until then to each so-called CPL frequency ($F_{CPL}$) thus determined.

10 Claims, 3 Drawing Sheets

(51) Int. Cl.
  *H04B 3/28* (2006.01)
  *H04L 27/36* (2006.01)

(56) References Cited

U.S. PATENT DOCUMENTS

| | | | |
|---|---|---|---|
| 7,356,049 B1* | 4/2008 | Rezvani | 370/484 |
| 7,801,076 B2* | 9/2010 | Thyagarajan et al. | 370/329 |
| 2005/0249245 A1* | 11/2005 | Hazani et al. | 370/485 |
| 2007/0047631 A1* | 3/2007 | Bostoen et al. | 375/222 |
| 2007/0047632 A1* | 3/2007 | Tung | 375/222 |
| 2007/0291639 A1* | 12/2007 | Jacobsen et al. | 370/208 |
| 2008/0247537 A1 | 10/2008 | Henry et al. | |
| 2011/0211827 A1* | 9/2011 | Soto et al. | 398/25 |
| 2011/0273213 A1* | 11/2011 | Rama | 327/291 |
| 2012/0185237 A1* | 7/2012 | Gajic et al. | 704/8 |

OTHER PUBLICATIONS

Preliminary Examination Report on Patentability in English, for PCT/EP2010/053242, dated Sep. 29, 2011 (cited references listed in this report have been previously filed in U.S. Appl. No. 13/257,392).

International Search Report for PCT/EP2010/053242, mailed May 12, 2010.

Hazen, M.E., "The Technology Behind HomePlug AV Powerline Communications", COMPUTER, vol. 41, No. 6, (Jun. 1, 2008), pp. 90-92.

Lukasza, Z. et al., "Performance Analysis of Uncoded/Coded Windowed-OFDM and Circular Wavelet-OFDM Transmission in PLC Channel with Bit-Loading", Signals and Electronic System, (Sep. 14, 2008), pp. 423-426.

Akiyama, Y. et al., "Influence of a PLC Signal Induced into the Modem on the Communication Performance of VDSL", Electromagnetic Compatibility, vol. 1, (May 11, 2003), pp. 197-200.

* cited by examiner

METHOD AND DEVICE FOR REDUCING INTERFERENCE BETWEEN A POWER LINE CARRIER SIGNAL AND A VDSL TYPE SIGNAL

This application is the U.S. national phase of International Application No. PCT/EP2010/053242, filed 15 Mar. 2010, which designated the U.S., and claims priority to FR Application No. 09/51739, filed 18 Mar. 2009, the entire contents of which is hereby incorporated by reference.

The present invention concerns a method and device for reducing interference between a carrier current signal transmitted over an electrical line and a signal of the VDSL type transmitted over a telephone line that is situated close to the electrical line.

It is known that digital services, such as internet access, internet telephony or high-definition television, which are often grouped together by the operators under an offer known as triple play, are distributed at subscribers both by a telephone network but also by an electrical network.

FIG. 1 shows an example of a system for distributing such digital services to the residence of a subscriber.

The system SYST comprises network equipment ER situated at the termination of the local loop and commonly referred to as DSLAM (Digital Subscriber Line Access Multiplexer). The function of this network equipment is to group together the data traffic passing over the telephone lines that are connected thereto, and to redirect this traffic to the internet once the various data have been time multiplexed. The network equipment ER also performs the reverse operation, which consists of demultiplexing the traffic data that arrive thereat and are intended for the subscriber and routing a carrier signal for these data via a telephone line Lext. Generally, the line Lext is formed by a pair of copper cables shown schematically in FIG. 1 by two parallel lines.

The domestic installation of a subscriber may comprise telephone sets P1 and P2 that are connected to a private telephone network formed by a pair of copper cables shown schematically in FIG. 1 by two parallel lines and designated as being a line Lpots. The sets P1 and P2 are connected to the line Lext via the line Lpots either through filters the function of which is to allow only the telephony signals to pass, or through a separator SPL (master splitter) that centralises this filtering function.

The domestic installation of the subscriber also comprises a gateway GW that is designed to receive the signal carried by the line Lext on one of the ports E thereof. The port E of the gateway GW can be connected either directly to the line Lext or to a port OSPL of the separator SPL.

The gateway GW comprises a modem MDSL that is connected to the port E of the gateway GW and to another Ethernet-type port S of the gateway GW. The modern MDSL is either integrated, or external to the gateway GW.

The type of modem MDSL depends on the transmission technology (standard) that is used. Historically, ADSL (Asymmetric Digital Subscriber Line) technology was (and is still) used but the invention is situated in the case of technologies of the VDSL (Very high bit rate DSL) type and more particularly the VDSL2 standard (ITU G.993.2).

Technologies of the VDSL type define a signal processing chain so that the data are transmitted between a sender and one or even several receivers.

On the sender side, the data to transmitted are normally coded according to an error correcting code of the FEC (Forward Error Code) type, and then the codes obtained are matched with a symbol of a constellation of a modulation of the QAM (Quadrature Amplitude Modulation) or PSK (Phase Shift Keying) type. The length of these symbols, hereinafter referred to as the QAM symbol, depends on the dimension of the constellation of the modulation adopted: 4QAM, 16QAM, BPSK (Binary Phase Shift Keying). The bits of each QAM symbol are then transmitted by a multicarrier modulation of the OFDM (Orthogonal Frequency Division Multiplexing) type, the frequencies of which, referred to as carrier frequencies, are orthogonal to each other and are distributed in a reserved frequency band on a predetermined frequency plane. OFDM symbols are then sent over the transmission channel.

For VDSL2 technology for example, the reserved frequency band goes from 2 to 30 MHz and two frequency planes (plane 9997 and 9998) are defined, one is used for the transmission of uplink signals, that is to say from the installation of a subscriber to the external network, and the other is used for the transmission of down-link signals, that is to say from the external network to the installation of the subscriber. The frequency planes are defined by the following equation:

$$F_k = F_0 - k \cdot \Delta_F \quad (1)$$

with $F_k$ a carrier frequency of index k, $$\Delta_F = \frac{1}{T_S}$$

where $T_S$ is the duration of an OFDM symbol and $F_0$ is an initial carrier frequency. The value of the frequency increment $\Delta_F$ is equal to either 8.6125 kHz or 4.3125 kHz for a duration of $T_S$ equal to 232 μs.

On the receiver side, the QAM symbols thus transmitted are obtained from a demodulation of the OFDM symbols received and the data then obtained by a demodulation of the QAM symbols according to the constellation used at the sender following decoding of the error correcting code.

Technologies of the VDSL type use a method, referred to as bit loading, for attributing the QAM symbol bits to the various carrier frequencies. This method is implemented by the equipment ER. It attributes to each carrier frequency $F_k$ a number of bits according to an estimated signal to noise ratio of the transmission channel of the telephone line at the carrier frequency $F_k$. The attributions of the bits to the various carrier frequencies are performed independently of one another.

Two approaches are generally used for implementing the method for attributing the QAM symbol bits to be transmitted.

According to the first, the capacity of the transmission channel is maximised subject to the constraint that the maximum transmission power value of each carrier frequency complies with a specific spectral density profile.

Figure 2:
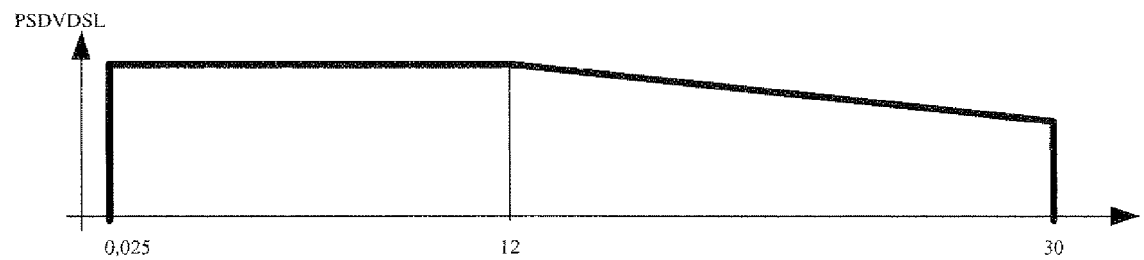

FIG. 2 shows an illustration of a power spectral density profile of the carrier frequencies according to a technology of the VDSL type on the reserved frequency band 25 kHz-30 MHz. It can be noted that the PSDVDSL power spectral density profile according to VDSL technology is not constant on the reserved frequency band. This because, from 25 kHz to 12 MHz, the PSDVSDL profile forms a level step. On the other hand, beyond 12 MHz, the PSDVDSL profile decreases to the extreme end of the 30 MHz frequency band. The decrease in the PSDVDSL profile causes greater sensitivity to interference in the transmission of the signals of the VDSL type on the carrier frequencies that belong to the 12 MHz-30 MHz frequency range.

According to the second approach, the power emitted per carrier is minimised subject to the constraint of a fixed transmission capacity.

Figure 3:
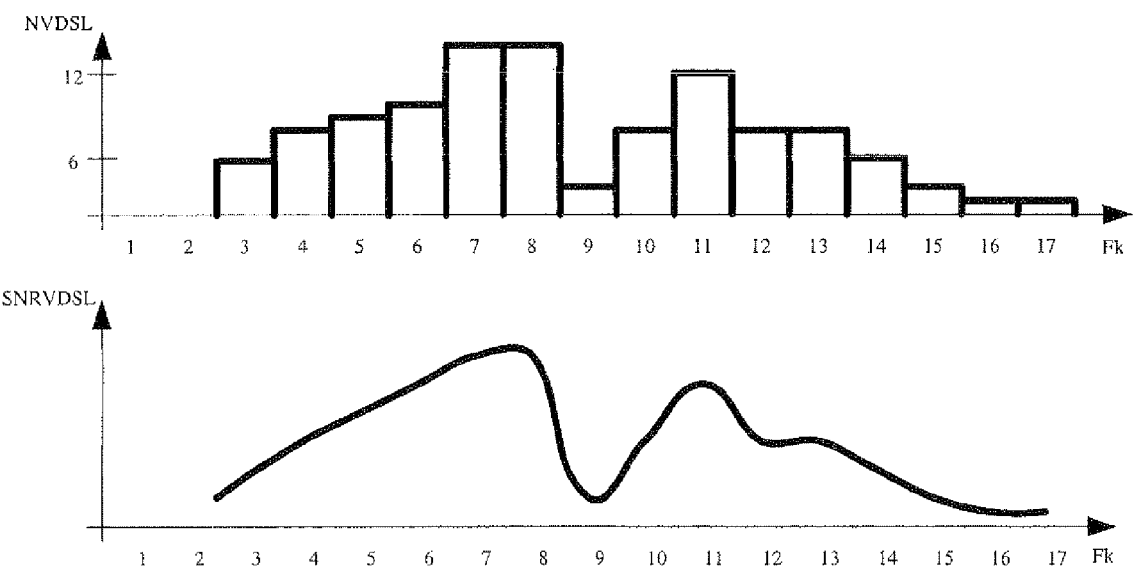

FIG. 3 shows timing diagrams illustrating an example of attribution of bits to the various carrier frequencies of a frequency plane according to an estimated SNRVDSL signal to noise ratio of the transmission channel of a telephone line. The top timing diagram shows the number of attributed NVDSL bits according to the carrier frequencies $F_k$, which are here referenced 1 to 17. The number of bits attributed to each frequency $F_k$ is entered on the vertical axis and a rectangle centred on each carrier frequency $F_k$ represents the width of the frequency band around each carrier frequency. The bottom timing diagram shows an example of an estimated SNR signal to noise ratio on the VDSL channel of the telephone line Lpots.

According to this example, the SNRVDSL signal to noise ratio is very high in particular for frequencies 7 and 8, for which a maximum of bits is attributed while complying with the PSDVDSL power spectral density profile. It is very low in particular for carrier frequencies 3, 14, 15, 16 or 17, for which a very small number of bits is attributed.

The particularity of a distribution system like the one in FIG. 1 stems from the use of an electrical system, in this case at the home of the subscriber, shown schematically in FIG. 1 by the line LE, for routing high-rate flows of the signal carried by the line Lext to the various items of equipment of the subscriber, which can thus be physically very distant from the gateway GW.

Carrier current line (CPL) or PLC (Power Line Communication) or BPL (Broadband for Power Line), which is used on this electrical system, is then spoken of.

A carrier current line CPL may for example be in accordance with the HomeplugAV standard (HomePlug Power-Line Alliance, "HomePlug AV baseline specification", Version 1.0.00, December 2005), or the ITU G.hn standard for example or based on the technology developed by the UPA/OPERA or Panasonic companies.

These standards (or technologies) use the same type of transmission as that used by the VDSL-type standards (technology), that is to say they also use an error correcting code of the FEC type, a modulation of the QAM or PSK type and a multicarrier modulation of the OFDM type.

The reserved frequency band goes from 2 to 30 MHz or soon from 1 to 80 MHz for the ITU G.hn standard, the frequency planes are defined by equation (1) for duration values of an OFDM symbol equal either to 40.95 μs, or to 11.611 μs according to the HomeplugAV standard, and the PSDCPL spectral density follows a constant profile over the entire reserved frequency band.

A method for attributing the QAM symbol bits to the various carrier frequencies is also used, the principle of which is similar to that used for the VDSL-type technology (standard) considering this time an estimated signal to noise ratio on the transmission channel of the carrier current line.

Implementation of a CPL technology (standard) requires the use of special modems, referred to as carrier current modems, which are connected to the electrical system. A carrier current modem therefore also comprises means for implementing a method of attributing bits by carrier frequency.

According to the example of the system in FIG. 1, two carrier current modems CPL1 and CPL2 are shown by way of illustration. The modem CPL1 is connected firstly to the port S of the gateway GW via for example an Ethernet cable ETH and secondly to an electrical socket PE1 of the private electrical system that is situated close to the gateway GW. The modem CPL2 is connected firstly to equipment EQ1 of the subscriber and secondly to another socket PE2 of the private electrical system that is situated close to the equipment EQ1.

For example, the equipment EQ1 is a set top box STB that comprises a video stream decoder and is connected to a television set TV by a video cable CTV.

Thus the data carried by the signal intended for the equipment EQ1 are routed from the network equipment ER to the modem CPL1 via the line Lext and the gateway GW. The modem CPL1 then obtains a carrier current signal that carries these data. This signal is then accessible from any electrical socket in the private electrical system and in particular the electrical socket PE2 to which the modem CPL2 is connected. The modem CPL2 then obtains a signal from this carrier current signal and routes it to the equipment EQ1 via an Ethernet-type link ETH.

The distribution system at a subscriber to digital services in FIG. 1 is an example of a system that can be extended to a digital service distribution system for a group of subscribers who are situated for example in a building. This is because, in this case, the network equipment ER groups together the data traffic passing over the telephone lines of the different subscribers and redirects these different traffics to the internet. Moreover, this equipment demultiplexes the traffic data that arrive thereat and routes a carrier signal for these data via the telephone line Lext to a gateway that is, in this case, connected to the gateway GW of the domestic installation of each subscriber. In this case, the telephone line Lext can be situated close to a line of an electrical system.

It has been observed that, when the technologies of the VDSL and CPL type were used, the signals carried by the electrical network and by the telephone system interfere with each other, when a line of the electrical system is situated close to a line of the telephone network.

This is because, as these technologies use the same frequency band, and the same multicarrier modulation principle, in this case OFDM, and the telephone lines are often close to the electrical lines as illustrated in FIG. 1 by the zones Z1 and Z2 in which the lines Lpots and Le are close to each other, these lines are coupled together, that is to say the signals carried by these lines interfere with each other by radiation.

In addition, as the modem MDSL and the carrier current modem (CPL1) must be situated close to each other and any modem must be supplied electrically, it is usual for the supply to the modems used in a digital service distribution system as above to take place from the same branch of an electrical system, that is to say supplied by an electrical source PW of FIG. 1, which causes interference by conduction between these modems.

These two types of interference result in contaminating the signals carried both by the telephone line Lpots and the electrical line Le, contamination that results in particular in rate losses with regard to the transmission of the signal earned by the telephone line Lpots.

Studies have been carried out to reveal these types of interference. It is possible to cite in particular the document of Lukasz Zbydniewski et al. entitled "Performance analysis of uncoded/coded windowed-OFDM and circular wavelet-OFDM transmission in PLC channel with bit-loading", Signals and Electronic Systems, 2008, ICSES'08, International Conference on, IEEE, Piscataway, N.J., USA, 2008-09-14, p. 423-426, or the document of Akiyama et al. entitled: "Influence of a PLC signal induces into the modem on the communication performance of VDSL". Electromagnetic Compatibility, 2003, EMC'03, IEE International Symposium on Istanbul, Turkey, 11-16 May 2003, Piscataway, N.J., USA, IEEE, vol. 1, 2003-05-11, p. 197-200, or the American patent application US 2008/247537A1.

The document of Hazen M. E. entitled "The Technology Behind HomePlug AV Powerline Communications", Computer, IEEE Service Center, LOS ALAMITOS, Calif. US, Vol. 41, No. 6, 1 Jun. 2008, pages 90-92, presents a method of reducing this interference that consists of using or not data carrier frequencies on the carrier current line. This method does not take account of the coupling between the electrical line and the telephone line.

Thus, in general terms, one of the aims of the present invention is to reduce the interference between a carrier current signal transmitted over an electrical line and a signal of the VDSL type transmitted over a telephone line that is situated close to the electrical line, whether these lines form part of a digital service distribution system at the home of a subscriber or a system designed to route data to several domestic subscriber installations.

To this end, according to one of the aspects thereof, the present invention concerns a method of reducing interference between a carrier current signal transmitted over an electrical line and a signal of the VDSL type transmitted over a telephone line that is situated close to the electrical line. Said signals route data in the form of bits that are attributed to carrier frequencies distributed in the same frequency band on different frequency planes, the method is characterised in that it comprises a step for determining at least one carrier frequency, referred to as the VDSL frequency, of a frequency plane used for transmitting the VDSL-type signal, the spectral power density level of which is higher than a predetermined threshold, a step for determining at least one carrier frequency, referred to as the CPL frequency, of another frequency plane used for transmitting the carrier current signal and that is common with at least one VDLS frequency thus determined, and a step for reducing the number of bits attributed up till then to each CPL frequency thus determined.

The bit attribution method of the CPL technologies (standards) attributes a number of bits to be transmitted per carrier frequency taking account only of the estimated signal to noise ratio on the transmission channel of the electrical line and therefore not taking account of the coupling effect between the telephone line and the electrical line when these are situated close to each other.

The inventor observed that the effect of this coupling between the telephone line and the electrical line was mainly due to the high power levels of certain carrier frequencies used for the transmission of the OFDM symbols on the electrical line. In addition it was observed that, despite the frequency planes of the VDSL and CPL technologies being different, some of these carrier frequencies had common values, that is to say either identical or close to those of the carrier frequencies of the VDSL technology.

Thus, by comparing the spectral power density level of the carrier frequencies used for transmitting a signal of the VDSL type with a predetermined threshold value, the method according to the invention makes it possible to determine the carrier frequencies of the carrier current signal that disturb the VDSL-type signal and to reduce the power level of these carrier frequencies by decreasing the number of bits that were attributed to them previously.

According to another of the aspects thereof, the present invention concerns a device that comprises means for implementing the method of reducing interference between a carrier current signal transmitted over an electrical line and signal of the VDSL type transmitted over a telephone line above.

According to another of the aspects thereof, the present invention also concerns a carrier current modem that comprises such a device.

Figure 4:
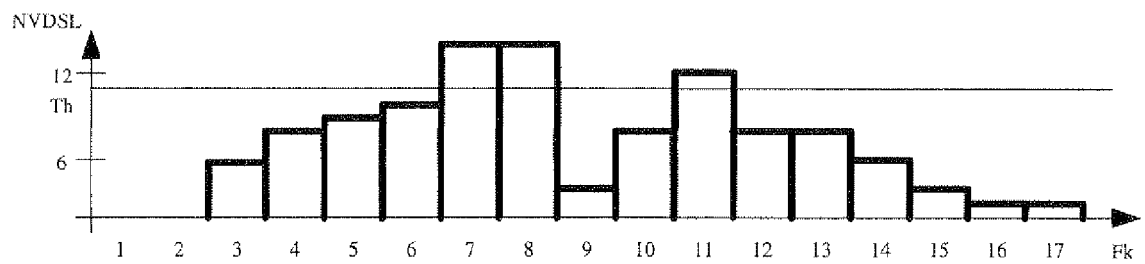
Figure 4:
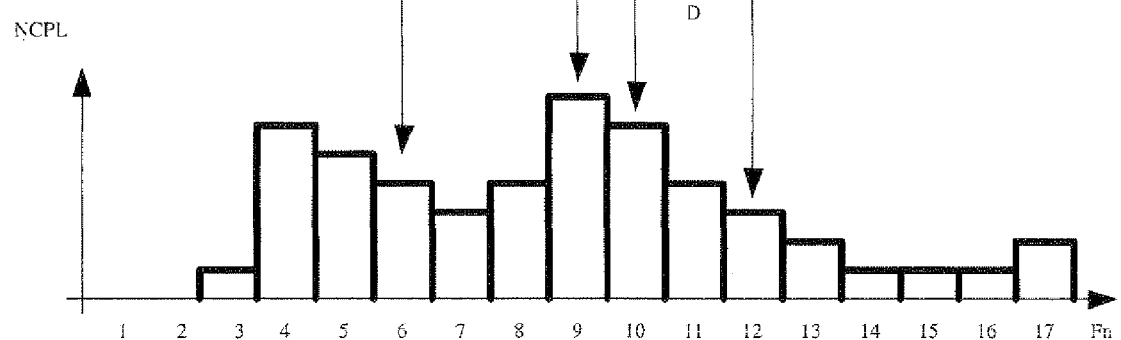
Figure 4:
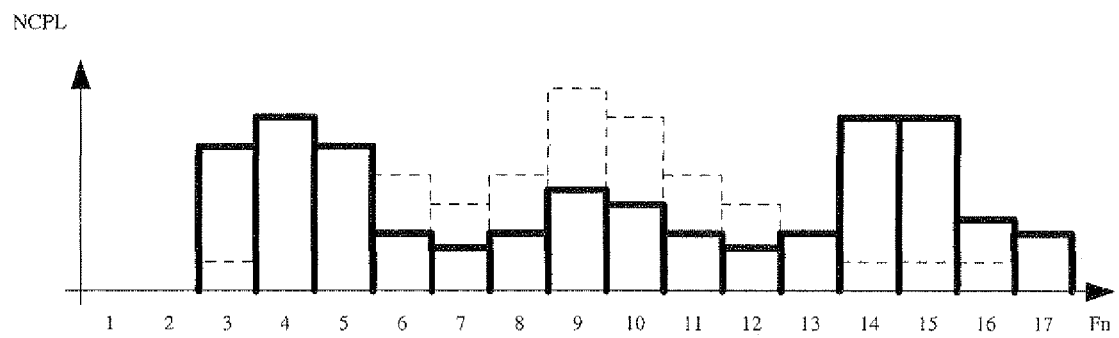

The features of the invention mentioned above, as well as others, will emerge more clearly from a reading of the following description of an example embodiment, said description being given in relation to the accompanying drawings, among which:

FIG. 1 shows an example of a system for distributing such digital services to the home of a subscriber, FIG. 2 shows an illustration of the spectral power density profile of the carrier frequencies according to a VDSL technology, FIG. 3 shows timing diagrams depicting schematically an example of attribution of bits to the carrier frequencies of a frequency plane according to an estimated SNRVDSL signal to noise ratio, FIG. 4 shows an example of implementation of the interference reduction method according to the invention.

Hereinafter the invention is described in the case where the signal carried by a telephone line is of the VDSL2 type. However, it is obvious that the invention can also apply to other types of signal as long as these signals use a multicarrier coding method.

FIG. 4 shows an example of implantation of the interference reduction method according to the invention.

The timing diagram at the top of FIG. 4 repeats the example of attribution of bits of FIG. 3.

The reduction method comprises a step 1 for determining at least one carrier frequency $F_{VDSL}$, referred to as the VDSL frequency, of a frequency plane used for transmitting the signal SVDSL of the VDSL type, the spectral power density level of which is higher than a predetermined threshold Th. It can be noted that the predetermined threshold Th is shown in FIG. 4 as being a maximum number of bits attributed to a carrier frequency. Which is equivalent to determining a maximum spectral power density level that is proportional to this number of bits.

According to this example, it can be seen that the frequencies referenced 7, 8 and 11 are then determined as being frequencies $F_{VDSL}$.

It can be noted that, during step 1, the carrier frequencies of each of the two frequency planes (997/998) used by a VDSL technology are considered. Thus, in the case of VDSL2, the spectral power density levels of the carrier frequency situated in the band from 25 kHz to 12 MHz and in the band from 12 MHz to 30 MHz are analysed.

The interference reduction method also comprises a step 2 for determining at least one carrier frequency $F_{CPL}$, referred to as the CPL frequency, of a frequency plane used for transmitting the carrier current signal and which is common with at least one frequency $F_{VDSL}$ thus determined.

According to one embodiment, a CPL frequency and a VDSL frequency are common when they are separated by a distance less than a maximum predetermined distance D that may be either zero, that is to say the VDSL and CPL frequencies are equal, or greater than zero, whether this be in the strict or broad sense.

Preferably, the distance is defined by the difference between the cardinal sine of the carrier frequency of the signal $S_{VDSL}$ weighted by a filter that limits the secondary lobes of the cardinal sine, and the cardinal sine of the carrier frequency of the carrier current signal $S_{CPL}$ weighted by a filter that limits the secondary lobes of the cardinal sine.

The timing diagram in the middle of FIG. 4 shows an example of attribution of bits to the carrier frequencies of a frequency plane according to an estimated signal to noise ratio on the electrical line Le and complying with the constraints imposed by a spectral power density profile defined by the CPL technology (standard). The distance here is greater in the broad sense than zero. According to this example, the frequencies referenced 6, 7 and 8 of the frequency plane used by the transmission of the carrier current signal $S_{CPL}$ are determined as being common to the frequency $F_{VDSL}$ referenced 7. Likewise, the frequencies referenced 7, 8 and 9 are determined as being common to the frequency $F_{VDSL}$ referenced 8 and the frequencies referenced 10, 11 and 12 are determined as being common to the frequency $F_{VDSL}$ referenced 11. Finally, according to this example, the frequencies referenced 6 to 12 inclusive of the frequency plane used by the transmission of the carrier current signal $S_{CPL}$ are the frequencies $F_{CPL}$ determined during step 2.

The method also comprises a step 3 for reducing the number of bits $N_{CPL}$ attributed up until then to each frequency $F_{CPL}$ thus determined.

According to one embodiment, the number of bits $N_{CPL}$ attributed to a frequency $F_{CPL}$ is reduced until the interference of this frequency $F_{CPL}$ with the signal $S_{VDSL}$ is compensated for by an error correcting code used for coding the data carried by the signal $S_{VDSL}$.

By reducing the number of bits attributed to each frequency $F_{CPL}$, the spectral power density level decreases, which causes a reduction in the interference of the signal $S_{CPL}$ on the signal $S_{VDSL}$. However, the total number of bits sent is then less than what it was just before this reduction, which causes a drop in the transmission rate.

According to a variant of the method that makes it possible to keep a constant transmission rate, the bits that are no longer attributed to a frequency $F_{CPL}$ are attributed to at least one carrier frequency $F_k$ of the frequency plane used for transmitting the signal $S_{CPL}$, other than a frequency $F_{CPL}$. Thus the method reduces the interference between the signals $S_{CPL}$ and $S_{VDSL}$ by reducing the spectral density of the CPL frequencies that are responsible for this interference while keeping a transmission rate by carrier current constant by spreading these bits over carrier frequencies that do not create significant interference with the signal $S_{VDSL}$.

The timing diagram of FIG. 4 shows the attribution of the bits by carrier frequency for a given modulation diagram, once the above method has been executed. According to this example, the number of bits of each frequency $F_{CPL}$ is divided by 2. Thus the number of bits attributed to each of the frequencies referenced 6 to 12 is divided by 2. Moreover, according to this example, let it be accepted that the frequencies referenced 3, 14, 15 and 16 each have an estimated signal to noise ratio on the transmission channel of the high electrical line. The bits that are no longer attributed to the frequency $F_{CPL}$ are then attributed to these three frequencies, which are obviously themselves not $F_{CPL}$ frequencies.

As seen in the introductory part, each carrier frequency, and therefore each frequency $F_{CPL}$, carries the QAM (or PSK) symbol bits.

According to a variant, the modulation of the data to be transmitted that is used up until then for obtaining QAM signals the bits of which are attributed to the different carrier frequencies, is replaced by another modulation that requires lesser symbol lengths.

For example, let it be accepted that up until then a 16QAM modulation is used, this modulation can be replaced by a 4QAM modulation in order to divide the length of the symbols by four.

The reduction method according to the invention may be launched solely as soon as the QAM symbol bits have been attributed to the various carrier frequencies of the frequency planes used for the transmission over the electrical and telephone lines.

It is however preferable for this method to be iterated since the characteristics of the transmission channels on the telephone line and in particular on the electrical line vary greatly, in particular because of the starting and stopping of domestic appliances on the electrical line Le.

According to one embodiment, the method is therefore iterated periodically.

According to another embodiment, the method is iterated as soon as the characteristics of the transmission channel on the electrical line and/or the characteristics of the transmission channel on the telephone line vary.

According to another of the aspects thereof, the present invention concerns a device for reducing interference between a carrier current signal $S_{CPL}$ and a signal $S_{VDSL}$.

This device comprises means for implementing a method for attributing a number of bits to each carrier frequency of a frequency plane used by the transmission on the electrical line.

In particular, this device comprises means for obtaining the carrier frequencies of the frequency planes used by the transmission on the telephone line and means for determining whether these carrier frequencies have a spectral power density level greater than the threshold Th.

This device also comprises means for determining that a carrier frequency $F_{CPL}$ is common with a frequency $F_{VDSL}$ thus determined, and means for reducing the number of bits $N_{CPL}$ attributed until then to each frequency $F_{CPL}$ thus determined.

According to another of the aspects thereof, the present invention concerns a carrier current modem CPL1, CPL that implements, for example in digital form, a method for attributing a number of bits to each carrier frequency of a frequency plane used by the transmission on the electrical line. The carrier current modem is particular in that it implements, also in digital form, the means of the above device. For this purpose, according to one embodiment, the means of the device for obtaining the carrier frequencies of the frequency plane used by the transmission on the telephone line are designed so that, during periods of silence on the transmission channel of the carrier current line, that is to say when no OFDM symbol is being transmitted on this channel, these means amplify the VDSL-type signal so that the OFDM symbols carried by this signal are received by the OFDM receiver of the carrier current modem.

The invention claimed is:

1. A method of reducing interference between a powerline communications signal transmitted over an electrical line and a signal of the Very high bit rate Digital Subscriber Line (VDSL) type transmitted over a telephone line that is situated close to the electrical line, said signals carrying data in the form of bits that are attributed to carrier frequencies distributed in the same frequency band on different frequency plans, wherein said method comprises:

determining at least one carrier frequency, referred to as the VDSL frequency, of a frequency plan used for transmitting the VDSL-type signal with a spectral power density level of which is higher than a predetermined threshold, determining at least one carrier frequency, referred to as the powerline communications (CPL) frequency, of another frequency plan used for transmitting the powerline communications signal and which is separated by a distance less than, or equal to, a predetermined maximum distance with at least one VDSL frequency thus determined, and reducing an amount of bits attributed up until then to each CPL frequency thus determined.

2. The method according to claim 1, wherein the predetermined maximum distance is either zero or strictly greater than zero, or greater than or equal to zero.

3. The method according to claim 1, wherein the amount of bits attributed to a CPL frequency is reduced until the interference of this CPL frequency with the VDSL-type signal is compensated for by an error correcting code used for coding the data carried by the VDSL-type signal.

4. The method according to claim 1, wherein the bits that are no longer attributed to CPL frequency are attributed to at least one carrier frequency of the frequency plan used for transmitting the powerline communications signal, other than a CPL frequency.

5. The method according to claim 1, wherein the modulation of the data to be transmitted that is used up until then for obtaining QAM symbols the bits of which are attributed to the different carrier frequencies is replaced by another modulation that requires lesser symbol lengths.

6. The method according to claim 1, wherein the steps of claim 1 are iterated periodically.

7. The method according to claim 1, wherein the steps of claim 1 are iterated as soon as the characteristics of the transmission channel on the electrical line and/or the characteristics of the transmission channel on the telephone line vary significantly.

8. A device for reducing interference between a powerline communications signal transmitted over an electrical line and signal of the Very high bit rate Digital Subscriber Line (VDSL) type transmitted over a telephone line that is situated close to the electrical line, said signals carrying data in the form of bits that are attributed to carrier frequencies distributed in the same frequency band on different frequency plans, wherein said device comprises:

means for determining at least one carrier frequency, referred to as the VDSL frequency, of a frequency plan used for transmitting the VDSL-type signal with a spectral power density level higher than a predetermined threshold, means for determining at least one carrier frequency, referred to as the powerline communications (CPL) frequency, of another frequency plane used for transmitting the powerline communications signal and which is separated by a distance less than, or equal to, a predetermined maximum distance with at least one VDSL frequency thus determined, and means for reducing an amount of bits attributed up until then to each CPL frequency thus determined.

9. Powerline communications modem that implements a method for attributing an amount of bits to be transmitted to each carrier frequency of a frequency plan used by a transmission over an electrical line, said powerline communications modem comprising a device according to claim 8.

10. Powerline communications modem according to claim 9, wherein the means for obtaining the carrier frequencies of the frequency plan used by the transmission over the telephone line are designed so that, during periods of silence on the transmission channel of the electrical line, said means amplify the VDSL-type signal so that the symbols carried by this signal are received by the receiver of the powerline communications modem.

\* \* \* \* \*